US006509075B1

(12) United States Patent
McCurry et al.

(10) Patent No.: US 6,509,075 B1
(45) Date of Patent: *Jan. 21, 2003

(54) LABEL SYSTEM

(75) Inventors: Doug McCurry, Morganton, NC (US); Edward Redman, Morganton, NC (US)

(73) Assignee: Environmental Inks and Coatings Corporation, Morgantown, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/580,330

(22) Filed: May 26, 2000

Related U.S. Application Data

(63) Continuation-in-part of application No. 09/144,036, filed on Aug. 31, 1998, now Pat. No. 6,391,415.

(51) Int. Cl.[7] .................................................. B32B 9/00

(52) U.S. Cl. .................... 428/40.1; 428/41.3; 428/41.5; 428/41.6; 428/41.7; 428/41.8; 428/42.1; 428/346; 428/347; 428/351; 428/353; 428/355

(58) Field of Search ............................... 428/40.1, 41.3, 428/41.5, 41.6, 41.7, 41.8, 42.1, 346, 347, 351, 353, 355

(56) References Cited

U.S. PATENT DOCUMENTS

| | | | | | |
|---|---|---|---|---|---|
| 4,521,615 | A | * | 6/1985 | Frentzel | 528/75 |
| 5,262,222 | A | * | 11/1993 | Kingman | 428/195 |
| 5,366,251 | A | | 11/1994 | Brandt et al. | 283/81 |
| 5,384,160 | A | | 1/1995 | Frazzitta | 427/288 |
| 5,440,329 | A | | 8/1995 | Meggitt et al. | 347/212 |
| 5,458,714 | A | | 10/1995 | Brandt et al. | 156/237 |
| 5,512,930 | A | | 4/1996 | Brandt et al. | 347/212 |
| 5,546,114 | A | | 8/1996 | Tait et al. | 347/212 |
| 5,552,819 | A | | 9/1996 | Brandt et al. | 347/212 |
| 5,589,869 | A | | 12/1996 | Brandt et al. | 347/212 |
| 5,650,028 | A | | 7/1997 | Brandt et al. | 156/64 |
| 5,686,188 | A | | 11/1997 | Brandt et al. | 428/435 |
| 5,714,526 | A | | 2/1998 | Whymuzis | 523/161 |
| 5,766,325 | A | * | 6/1998 | Gundlach | 106/31.43 |
| 5,766,731 | A | | 6/1998 | Stein et al. | 428/195 |
| 5,800,656 | A | | 9/1998 | Geurtsen et al. | 156/239 |

FOREIGN PATENT DOCUMENTS

| | | |
|---|---|---|
| WO | WO 98/00291 | 1/1998 |
| WO | WO 98/00292 | 1/1998 |
| WO | WO 98/00294 | 1/1998 |
| WO | WO 98/26021 | 6/1998 |

* cited by examiner

*Primary Examiner*—Nasser Ahmad
(74) *Attorney, Agent, or Firm*—MacCord Mason, PLLC

(57) ABSTRACT

A label system having an unique label stock. The label stock includes a water-reducible ink system for forming a water resistant ink label and a scuff resistant protective, clear coat layer. A label carrier, formed from non-absorbent paper or plastic, receives the water resistant ink label. In the preferred embodiment, a heat-activated adhesive is applied to the surface of the color coat layer for transferring the label from the label carrier to the substrate. The heat-activated adhesive has an activation temperature less than the distortion temperature of the label carrier so as to not distort the image during transfer. A heat-activated, cross-linking agent may be added in at least one of the color coat and the protective, clear coat to improve water-soak resistance. The heat-activated, cross-linking agent has an activation temperature of greater than the activation temperature of the adhesive. This allows the adhesive to be activated at a first, lower temperature and the cross-linking agent to be activated at a second, higher temperature after the label has been transferred to the substrate. However, because of the mechanics of transferring a label, the heat-activated, cross-linking agent may have an activation temperature down to about equal to the activation temperature of the adhesive and still perform satisfactory.

71 Claims, 1 Drawing Sheet

LABEL SYSTEM

CROSS-REFERENCE TO RELATED APPLICATION

The present application is a continuation-in-part of U.S. patent application Ser. No. 08/144,036, filed Aug. 31, 1998 (now U.S. Pat. No. 6,391,415, issued May 21, 2002).

BACKGROUND OF THE INVENTION (1) Field of the Invention

The present invention relates generally to label systems and, more particularly, to a heat-activated label system for transferring a preprinted label and a protective coating in a single step from label stock to a substrate, such as a plastic crate or glass bottle.

(2) Description of the Prior Art

Containers, such as glass bottles, are currently labeled in several different ways. The predominant method is printed paper labels glued to the container at the time of filling and sealing. Such labels offer almost unlimited art potential and are commonly used on food and both returnable and non-returnable beverage containers. This is the lowest cost technique, but offers little resistance to label damage. Also, the glue systems used are a constant source of problems in high speed bottle filling operations.

A second, more recently developed, container labeling technique is of applying a thin styrofoam label to cover the container from shoulder to heel, with the decorative and/or informational material being printed on the more dense outer skin of the styrofoam label. This is widely used on lighter-weight, one-way bottles common in the beverage industry. It offers some impact resistance and a large surface area for printing product information and instructions, as well as company logos. Unfortunately, it covers a majority of the container and prevents visual inspection of the contents by the consumer. In addition, it is more costly than the paper label, has little durability and becomes easily soiled. Also, because the printing surface is relatively rough, high definition printing is not possible. The styrofoam label also becomes a contaminate at the glass recycling center as well as at the glass plant when remelting the container.

A third container labeling technique is printing ceramic ink directly on the container surface using a screen printing technology. While the label appearance is generally good, the technique is typically limited to two or three colors due to cost considerations. A recent development is the preprinting of a ceramic ink decal which is then transferred to the glass container surface. This permits high definition printing and offers greater opportunities for color and art variety. Fired ceramic inks are extremely durable and will survive the alkali washing processes required of a returnable container. However, both the direct printing ceramic ink and ceramic ink decal techniques require subsequent high cost, high temperature firing to fuse the ink to the glass substrate. In addition, while the preprinted ceramic ink label reduces the technical problems somewhat, both techniques require extreme attention to detail and a high level of maintenance and are run off-line at slower speeds, with high labor costs. Due to these higher costs, ceramic inks are the least commonly used labeling technique.

Another, more recent, technique is disclosed in U.S. Pat. No. 5,366,251, issued to Brandt. Brandt teaches a label comprising an opaque or clear film substrate, which has preferably been coated on both sides with acrylic to serve as a compatible interface bond with the other materials used in the process and also to provide a high gloss surface. Graphics are printed on the acrylic layer, preferably using a solvent-based acrylic ink. The graphics can be reverse printed when the film is clear, which gives the appearance of the "fired on" label. When the film is opaque, the graphics are front surface printed using the opaque film as a background or part of the graphics. The label is then provided on its container side with a two-layer, heat-activatable adhesive, activatable on contact with the heated container. A clear coat may be subsequently applied to protect the label during use, however, this requires a separate step.

U.S. Pat. Nos. 5,650,028 and 5,458,714, also issued to Brandt, disclose other embodiments of this technique and machinery to carry out the application of the label to the container. All three of these patents are hereby incorporated by reference in their entirety.

These techniques have also been considered for applying replaceable labels to polyethylene beer crates. However, the label must be sufficiently durable to pass scuff and water-soak resistance tests while, at the same time, be removable by a weak caustic solution to enable a new label to be added. Because the label must be easily removed, the label can not use a conventional protective, clear coat to provide the necessary protection to the label.

Thus, there remains a need for a new and improved heat-activated label system for transferring a preprinted label and a protective, clear coat in a single step from the label stock to a substrate, such as a plastic crate or glass bottle while, at the same time, selectively providing removability for crates or permanence for bottles and with improved scuff and water-soak resistance.

SUMMARY OF THE INVENTION

The present invention is directed to a label system having an unique label stock. The label stock includes a water-reducible ink system for forming a water resistant ink label. In the preferred embodiment, the ink system includes a color coat layer comprised of a first carboxylic acid functional resin selected from the group consisting of urethane, epoxy and acrylic carboxylic acid functional resins; and a protective, clear coat layer including a second carboxylic acid functional resin. For bottle applications, hydrophobic fumed silica was added to improve scuff and water resistance in the parent invention. A label carrier, formed from non-absorbent paper or plastic, receives the water resistant ink label.

The protective, clear coat layer is located between the surface of the label carrier and the color coat layer but becomes the outer layer of the label when the label is transferred to a substrate, such as a bottle or plastic carton. In the preferred embodiment, a silicon release finish is added between the protective, clear coat layer and the label carrier to aid in the release of the label from the label carrier surface. Also, a conventional, clear release coating may be added between the release finish and the label to provide additional protection for the label after transfer. As used herein, a release finish substantially stays with the label carrier and a release coating transfers with the label to the substrate.

In the preferred embodiment, a heat-activated adhesive is applied to the surface of the color coat layer for transferring the label from the label carrier to the substrate. The heat-activated adhesive has an activation temperature that is less than the distortion temperature of the label carrier, so as to not distort the image during transfer. Preferably, the activation temperature of the heat-activated adhesive is less than about 350° F. and, most preferably, is about 150° F.

In the preferred embodiment of the parent invention, the heat-activated adhesive was an acrylic emulsion system which includes an adhesive agent, an anti-tacking agent, a viscosity stabilizer, and with the balance being water and further may include a plasticizer and a wetting agent to reduce "spider webbing" in some applications.

In the present invention, a polyurethane dispersion system has been developed for use in addition to the acrylic emulsion system of the parent invention. It has been found that the polyurethane dispersion system of the present invention produces superior performance over the acrylic emulsion system for high scuff-resistant cases, such as bottles where more resistance is needed, while, at the same time, eliminating the need for fumed silica to be added.

Also, in the preferred embodiment, the label stock further includes an intermediate, clear, primer coat between the adhesive and the water resistant ink label which provides improved transfer of the label from the label carrier to the substrate. In addition, it has been discovered that the use of the intermediate, clear, primer coat also improves removability for crate applications over just ink alone. Apparently, the inks become resoluble more quickly than the clear primer coat does.

Finally, a heat-activated, cross-linking agent may be added in at least one of the color coat, the protective, clear coat or the heat-activated adhesive to improve water-soak resistance for bottles or other applications where the label is not removable. The heat-activated, cross-linking agent is preferably selected from the group consisting of urea and melamine formaldehyde. The heat-activated, cross-linking agent has an activation temperature that is greater than the activation temperature of the adhesive and preferably is greater than about 250° F. In the most preferred embodiment, the heat-activated, cross-linking agent has an activation temperature of about 380° F. This allows the adhesive to be activated at a first, lower temperature and the cross-linking agent to be activated at a second, higher temperature after the label has been transferred to the substrate. However, because of the mechanics of transferring a label, the heat-activated, cross-linking agent may have an activation temperature as low as about equal to the activation temperature of the adhesive and still perform satisfactorily.

Accordingly, one aspect of the present invention is to provide a label stock including: (a) a water-reducible ink system for forming a water resistant ink label; (b) a label carrier having a top surface and a bottom surface for receiving the water resistant ink label on said top surface; and a heat-activated adhesive for transferring the label from the label carrier to a substrate, wherein the heat-activated adhesive is a polyurethane dispersion system.

Another aspect of the present invention is to provide a water-reducible ink system, the system including: (a) a color coat layer comprised of a first carboxylic acid functional resin; and (b) a protective, clear coat layer, wherein the protective, clear coat layer includes a second carboxylic acid functional resin and with the balance being water.

Still another aspect of the present invention is to provide a label stock, including: (a) a water-reducible ink system for forming a water resistant ink label, the system comprising: (i) a color coat layer comprised of a first carboxylic acid functional resin; and (ii) a protective, clear coat layer, wherein the protective, clear coat layer includes a second carboxylic acid functional resin and with the balance being water; (b) a label carrier having a top surface and a bottom surface for receiving the water resistant ink label on said top surface; and (c) a heat-activated polyurethane dispersion adhesive for transferring the label from the label carrier to a substrate.

These and other aspects of the present invention will become apparent to those skilled in the art after a reading of the following description of the preferred embodiment when considered with the drawings.

DESCRIPTION OF THE PREFERRED EMBODIMENTS

Figure 1:
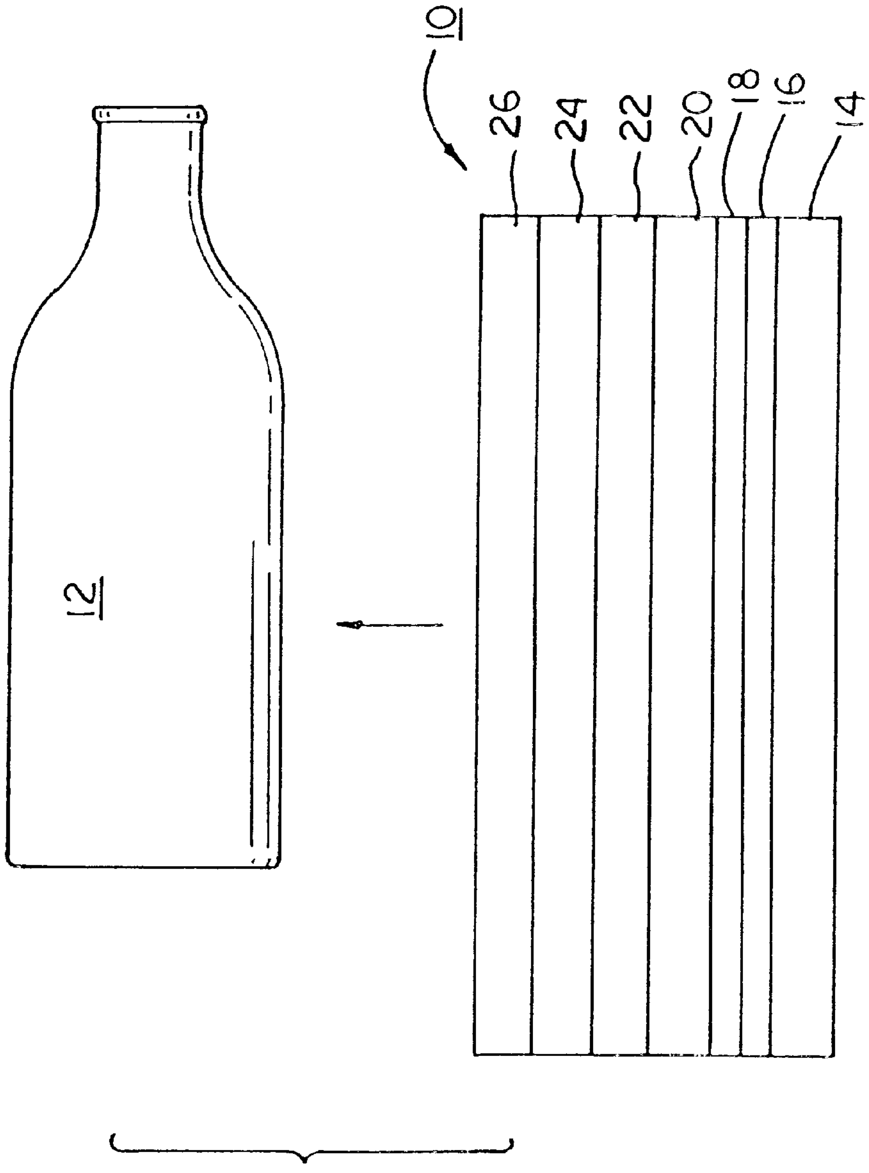
FIG. 1 is a schematic diagram illustrating a cross-sectional view of a label stock constructed according to the present invention about to be applied to the surface of a bottle.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a label stock, generally designated 10, is shown constructed according to the present invention about to be applied to the surface of a bottle 12.

For clarity, it should be understood that the label stock 10 is built up in layers using conventional coating equipment on a label carrier 14 and then transferred to a substrate, such as the bottle 12, using conventional labeling equipment. In doing so, the bottom layer of the label now become the top layer on the substrate 12.

The label carrier 14 is non-absorbent to allow easy release during transfer. The carrier 14 may be paper or extruded plastic film, such as polypropylene or polyester. In either case, it has been determined that the surface of the label carrier must have a surface tension of between about 30 and 37 dynes and, preferably, less than about 36 dynes in order to be wetted by water-based coatings and inks while, at the same time, still allowing release.

The label carrier may further include a release finish 16 on the top surface of label carrier 14 for aiding in the transfer of the label to the substrate 12. Similar to the label carrier 14, the release finish must have a surface tension of between about 30 and 37 dynes and, preferably, less than about 36 dynes to aid in release. In the preferred embodiment, the release finish is silicone, such as a 10 wt. % solution of Dow 84, available from the Dow Chemical Company, Midland, Mich. Also, a conventional, clear release coating 18 may be added between the release finish 16 and the label to provide additional protection for the label after transfer. The release finish 16 substantially stays with the label carrier 14 and the clear release coating 18 transfers with the label to the substrate 12.

The primary layers of the water resistant ink label, include a color coat layer 22 comprised of a first carboxylic acid functional resin; and a protective, clear coat layer 20.

The color coat layer 22 is selected from the group consisting of urethane, epoxy and acrylic carboxylic acid functional resins. The color coat layer 22 includes a hard solution, a soft emulsion, a colloidal dispersion, and with the balance being water, as will be described in more detail below.

The protective, clear coat layer 20 includes a second carboxylic acid functional resin and with the balance being water. Preferably, the amount of protective, clear coat 20 is between about 3 and 6 grams per meter$^2$ (Total Non-volatiles) of the label carrier 14. The protective, clear coat 20 adds to the impact resistance of the label, additionally protecting the label against abrasion and acting to enhance the visual appearance of the container, label and contents.

In the parent invention, hydrophobic fumed silica could be added to the protective, clear coat 20 to improve scuff and water resistance for permanent labels, such as bottle labels. The amount of hydrophobic fumed silica preferably is between about 0.5% and 1.0 wt. %.

Also, a heat-activated, cross-linking agent may be added to any or all the clear or color coats or heat-activated adhesive for improved water-soak resistance for permanent labels, as will be described in more detail below. Preferably, the heat-activated, cross-linking agent is selected from the group consisting of urea and melamine formaldehyde. As can be appreciated, the heat-activated, cross-linking agent has an activation temperature greater than the transfer temperature of the labeler and preferably greater than about 250° F. In the most preferred embodiment, the heat-activated, cross-linking agent has an activation temperature of about 380° F. This prevents cross-linking from occurring during normal label transfer which occurs at a lower temperature, as will be described in more detail below. However, because of the mechanics of transferring a label, the heat-activated, cross-linking agent may have an activation temperature as low as about equal to the activation temperature of the adhesive and still perform satisfactorily.

A heat-activated adhesive 26 is used to transfer the label from the label carrier 14 to the substrate 12. As will be appreciated, the heat-activated adhesive 26 should have an activation temperature less than the distortion temperature of the label carrier 14. For most plastic label carriers 14, the activation temperature of the heat-activated adhesive 26 is less than about 350° F. and, preferably, is about 150° F.

In the preferred embodiment of the parent invention, the heat-activated adhesive 26 was an acrylic emulsion system. The acrylic emulsion system includes an adhesive agent, an anti-tacking agent, a viscosity stabilizer, and with the balance being water, as will be described in more detail below. The acrylic emulsion system may include a plasticizer and a wetting agent to reduce “spider webbing” in some applications.

In the preferred embodiment of the present invention where properties of extreme resistance to scratch and moisture are required, the heat-activated adhesive 26 is a polyurethane dispersion system. The polyurethane dispersion system includes an adhesive agent, an adhesive promoter, a viscosity stabilizer (preferably ammonia) and with the balance being water, as will be described in more detail below. The polyurethane dispersion system may include a plasticizer and a wetting agent to reduce “spider webbing” in some applications. In the preferred embodiment, the anti-tacking agent in the acrylic emulsion system in the parent invention was not needed.

An intermediate, clear, primer coat 24 may be added between the adhesive 26 and the water resistant ink label. In the preferred embodiment, the intermediate, clear, primer coat 24 is an acrylic emulsion or polyurethane dispersion, as will be described in more detail below.

In operation, the label is applied to the substrate using commercially available labeling equipment. Immediately prior to labeling, the substrate surface is heated to between about 120° F. and 220° F., preferably about 150° F. At this surface temperature, the adhesive is almost instantly activated by the hot surface of the substrate 12 and provides a strong bond which separates the preprinted label from the label carrier and allows subsequent conveyorized handling without label movement or damage. In some label application machinery, the transfer is augmented by the use of a heated mandrel which presses the label stock 10 against the substrate 12. The use of pressure may allow lower transfer temperatures to be used in some applications. The temperature of the substrate is then increased to about 380° F. to heat-activate the cross-linking agent for those applications in which the label will be permanently affixed to the substrate, such as bottles.

For applications in which later removability of the label is desired, the cross-linking agent is not added. Molecules that contain enough carboxylic acid Groups, i.e. R—COOH, are capable of being made water soluble. This is done by reacting an organic amine or inorganic base with the —COOH groups to form a salt, i.e. —$CONH_3$. This amine salt will ionize in water and allow the organic molecule to dissolve in the water. Upon drying, evaporation of the water causes the organic amine or inorganic base to reform into its original molecular structure and evaporate into the surrounding air and thus the organic salt reverts back to its original molecular structure and becomes insoluble again. It has been discovered that if the acid number of the coating is less than about 55, the label will remain insoluble during normal usage. If a strong base, such as a NaOH solution is applied to the label formed from such a dried resin system, the Na will react with the —COOH groups to form a water soluble salt, —COONa, thereby allowing the label to be removed from the substrate. The substrate can then be reprinted with new graphics.

According to the parent invention, the protective, clear coat 20 was prepared as follows. A low acid number carboxylic acid functional resin, such as Joncryl 537 (available from S. C. Johnson of Racine, Wis.) is mixed with defoamer and wax, such as, S-483 (available from Shamrock of Newark, N.J.) pH adjusted and diluted with water. Also, in the parent invention, about 1 wt. % hydrophobic fumed silica was added when scuff and water resistance is required. About 7 wt % heat-activated cross-linking agent, such as Cymel 385 (available from Cytec Industries of West Paterson, N.J.) is added when removability is not required. In the preferred embodiment of the parent invention, the hydrophobic fumed silica and wax are separately pre-mixed and diluted prior to mixing with the low acid number carboxylic acid functional resin.

According to the present invention, the protective clear coat resin 20 is prepared in one of two ways as follows. A carboxylic acid functional resin, such as Joncryl 2630 (available from S C Johnson of Racine, Wis.) and an acrylic dispersion, such as E 2426 (available from Rohm and Haas of Philadelphia, Pa.) are mixed with deformer and wax, such as S483 (available from Shamrock of Newark, N.J.) pH adjuster and diluted with water.

According to the present invention, when extreme resistance properties, such as scratch and water resistance are required, the protective clear coat resin 20 is prepared as follows. A low acid number carboxylic acid functional resin, such as Cydrothane 6000 (available from Cytec Industries of West Paterson, N.J.) is mixed with waxes, such as Dow 51 (available from Dow Corning of Midland, Mich.) and AQ50 (available from Shamrock of Newark, N.J.), a wetting agent, such as Tego Wet 500 (available from Tego Chemie of Hopewell, Va.), a heat-activated, melamine cross-linking agent, such as Cymel 385 (available from Cytec Industries of West Paterson, N.J.) pH adjuster and diluted with water.

Also, according to the parent invention, the color coat 22 was prepared as follows. An acrylic resin, such as Joncryl 2630 (available from S. C. Johnson of Racine, Wis.) is mixed with an acrylic resin solution such as E2426 (available from Rohm Haas of Philadelphia, Pa.) pigment and diluted with water. In the present invention, in applications requiring extreme resistance, such as, scratch and water resistance, an acrylic resin, such as Joncryl 537 (available from S C Johnson of Racine, Wis.), a coalesing solvent, such as butyl cellosolve, a wax, such as, S483 (available from Shamrock of Newark, N.J.) are mixed with a pigment and diluted with water. About 7 wt. % heat-activated cross-linking agent, such as Cymel 385 (available from Cytec Industries of West Paterson, N.J.) is added when removability is not required. It has been found that some pigments may react with the cross-linking agent. In these cases, the cross-linking agent is added just prior to printing. The cross-linking agent has not been found to react with the protective, clear coat and can be added any time prior to printing.

According to the parent invention, the intermediate, clear primer coat 24 was prepared as follows. An acrylic resin, such as Joncryl 2630 (available from (available from S. C. Johnson of Racine, Wis.) is mixed with an acrylic emulsion such as CT 4213 (available from PPG of Cincinnati, Ohio) and diluted with water. About 7 wt. % heat-activated cross-linking agent, such as Cymel 385 (available from Cytec Industries of West Paterson, N.J.) was added in the parent invention when removability was not required.

According to the present invention, the intermediate, clear primer coat 24 is prepared in one of two ways as follows. An acrylic resin, such as Joncryl 2630 (available from (available from S. C. Johnson of Racine, Wis.) is mixed with an acrylic dispersion such as E 2426 (available from Rhom and Haas of Philadelphia, Pa.) and diluted with water.

According to the present invention, when extreme resistance properties, such as scratch and water resistance are required, the intermediate, clear primer coat 24 is prepared as follows. A low acid number carboxylic acid functional resin, such as Cydrothane 6000 (available from Cytec Industries of West Paterson, N.J.) is mixed with waxes, such as Dow 51 (available from Dow Corning of Midland, Mich.) and AQ50 (available from Shamrock of Newark, N.J.), a wetting agent, such as Tego Wet 500 (available from Tego Chemie of Hopewell, Va.), a heat-activated, melamine cross-linking agent, such as Cymel 385 (available from Cytec Industries of West Paterson, N.J.) pH adjuster and diluted with water.

According to the parent invention, the heat-activated adhesive 26 was prepared as follows. In one embodiment, a heat-activated acrylic adhesive, such as Joncryl 751 (available from S. C. Johnson of Racine, Wis.) is added to an anti-tacking agent, such as Joncryl 2630 (available from S. C. Johnson of Racine, Wis.), a viscosity stabilizer, such as Vicar 460X46 (available from B. F. Goodrich of Cleveland, Ohio), and with the balance being water.

According to the present invention, the heat-activated adhesive 26 is prepared as follows. In one embodiment, a heat-activated acrylic emulsion adhesive, such as Joncryl 751 (available from S. C. Johnson of Racine, Wis.) is added to an anti-tacking agent, such as Joncryl 2630 (available from S. C. Johnson of Racine, Wis.), a viscosity stabilizer, such as Vicar 460X46 (available from B. F. Goodrich of Cleveland, Ohio), and with the balance being water.

In a second embodiment, when extreme resistance properties, such as scratch resistance, pasteurization resistance and long term water immersion resistance are required, the heat-activated adhesive 26 is prepared as follows. A heat-activated polyurethane dispersion adhesive, such as TMX DI 133-5 (available from Cytec Industries of West Paterson, N.J.) is mixed with a wetting agent, such as, Tegowet 500 (available from Tego Chemi of Hopewell, Va.), an adhesive promoter, such as, B-516.5W (available from Chartwell International of Attleboro Falls, Mass.), pH adjuster and with the balance being water.

The present invention can best be understood after a review of the following examples. Examples 1–12 were for the invention set forth in the parent application.

EXAMPLES 1–6

Various amounts of the heat-activated cross-linking agent described above were added to the protective, clear coat of the parent invention. Labels were made, transferred to glass bottles and further heated to activate the resin. The labeled bottles were subjected to a 20 day water-soak test to determine integrity. Suitability was measured on a scale of 1–5 with 5 being best.

TABLE 1

20 Day Soak Test Results

| Example | Wt. % | Soak Resistance |
|---|---|---|
| 1 | 0.0 | 1 |
| 2 | 2.5 | 1 |
| 3 | 5.0 | 3 |
| 4 | 7.0 | 5 |
| 5 | 10.0 | 5 |
| 6 | 12.0 | 5 |

These results clearly show that the parent invention with between about 5 and 10 wt. % of a heat-activated cross-linking agent provides satisfactory resistance to soaking, with 7 wt. % being preferred.

EXAMPLES 7–12

Various amounts of hydrophobic fumed silica as described above were added to the protective, clear coat of the parent invention. Labels were made, transferred to glass bottles and further heated to activate the cross-linking resin. The labeled bottles were subjected to scuff testing to determine integrity and the transparency of the coating was determined visually. The test method used was a Simulated Line Abrader, made by American Glass Research of Butler, Pa. The test was run immediately after the labeled bottles were soaked in water for 2 hours at 140° F. and then 2 hours at 149° F. to simulate Pasteurization which occurs during the beer bottling process. Suitability was measured on a scale of 1–5 with 5 being best.

TABLE 2

Scuff Test Results

| Example | Wt. % | Transparency | Scuff Resistance |
|---|---|---|---|
| 7 | 0.1 | 5 | 1 |
| 8 | 0.5 | 5 | 4 |
| 9 | 1.0 | 4 | 5 |
| 10 | 1.5 | 2 | 5 |

TABLE 2-continued

| Scuff Test Results | | | |
|---|---|---|---|
| Example | Wt. % | Transparency | Scuff Resistance |
| 11 | 2.0 | 1 | 5 |
| 12 | 2.5 | 1 | 5 |

These results clearly show that the parent invention with between about 0.5 and 1.0 wt. % of hydrophobic fumed silica provides satisfactory scuff resistance and transparency, with 1 wt. % being preferred.

EXAMPLES 13–18

Various polymers and copolymers systems were tested in the protective, clear coat 20, the intermediate, clear primer coat 24, and adhesive 26, of the present invention. Labels were made, transferred to bottles and further heated to activate the cross-linking resin. The labeled bottles were subjected to scratch and scuff testing to determine integrity, and the transparency of the coating was determined visually. The test method used was a Simulated Line Abrader (available from American Glass Research of Butler, Pa.) and a variable tension scratch pen (available from Erichsen GmbH and Co. of Hemer, Germany). The testing was conducted on dry bottles at ambient temperature and also immediately after the labeled bottles were soaked in water for 30 min. at 140° F. and then 30 min. at 150° F. to simulated pasteurization which occurs during the beer bottling process. Suitability was measured on a scale of 1–5 with 5 being best.

TABLE 3

| Scuff and Scratch Test Results | | | | |
|---|---|---|---|---|
| | Conc. Acrylic/ | | Scratch Resistance | |
| Example | Polyurethane | Transparency | Dry | Wet |
| 13 | 100/0 | 2 | 3 | 1 |
| 14 | 75/25 | 3 | 3 | 1 |
| 15 | 50/50 | 3 | 4 | 2 |
| 16 | 40/60 | 4 | 4 | 2 |
| 17 | 20/80 | 5 | 4 | 4 |
| 18 | 0/100 | 5 | 5 | 5 |

These results clearly show that the present invention shows improved scratch resistance as the amount of polyurethane is increased while, at the same time, the transparency also improves as the amount of polyurethane is increased.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A label stock, comprising:

(a) a water-reducible ink system for forming a water resistant ink label;

(b) a label carrier having a top surface and a bottom surface for receiving said water resistant ink label on said top surface of said label carrier;

(c) a heat-activated adhesive for transferring said label from said label carrier to a substrate, wherein said heat-activated adhesive is on the surface of said water reducible ink label opposite from the surface of said water reducible ink label adjacent to said label carrier, wherein said heat-activated adhesive is a polyurethane dispersion system.

2. The label stock of claim 1 wherein said heat-activated adhesive has an activation temperature less than the distortion temperature of said label carrier.

3. The label stock of claim 2 wherein said activation temperature of said heat-activated adhesive is less than about 350° F.

4. The label stock of claim 3 wherein said activation temperature of said heat-activated adhesive is about 150° F.

5. The label stock of claim 1 wherein said polyurethane dispersion system includes an adhesive agent, an adhesion promoter, a viscosity stabilizer, and with the balance being water.

6. The label stock of claim 1 wherein said polyurethane dispersion system further includes a plasticizer and a wetting agent.

7. The label stock of claim 6 wherein said plasticizer is between about 0.5 and 1 wt. %.

8. The label stock of claim 6 wherein said plasticizer is about 1 wt. %.

9. The label stock of claim 6 wherein said wetting agent is between about 0.1 and 0.5 wt. %.

10. The label stock of claim 6 wherein said wetting agent is about 0.2 wt. %.

11. The label stock of claim 1 further comprising an intermediate, clear, primer coat between said adhesive and said water resistant ink label.

12. The label stock of claim 11 wherein said intermediate, clear, primer coat is a polyurethane dispersion.

13. The label stock of claim 1 wherein said label carrier is non-absorbent.

14. The label stock of claim 13 wherein said label carrier is paper.

15. The label stock of claim 13 wherein said label carrier is plastic.

16. The label stock of claim 15 wherein said label carrier is extruded.

17. The label stock of claim 15 wherein said label carrier is selected from the group consisting of polypropylene and polyester.

18. The label stock of claim 13 wherein said label carrier has a surface tension of between about 30 and 37 dynes.

19. The label stock of claim 14 wherein said label carrier further includes a release finish on the top surface of said paper label carrier.

20. The label stock of claim 19 wherein said release finish has a surface tension of less than about 36 dynes.

21. The label stock of claim 20 wherein said release finish is silicone.

22. The label stock of claim 21 wherein said release finish includes silicone in the amount of greater than or equal to about 10 wt. %.

23. A water-reducible ink system, said system comprising:

(a) a color coat layer comprised of a first carboxylic acid functional resin; and (b) a protective, clear coat layer on one surface of said color coat layer, wherein said protective, clear coat layer includes a second carboxylic acid functional resin and with the balance being water.

24. The ink system of claim 23 wherein said color coat layer is selected from the group consisting of urethane, epoxy and acrylic carboxylic acid functional resins.

25. The ink system of claim 23 wherein said color coat layer includes a low acid number acrylic emulsion, a coalesing solvent, waxes, pigment and with the balance being water.

26. The ink system of claim 23 wherein said carboxylic acid functional resin has a lower acid number.

27. The ink system of claim 26 wherein said carboxylic acid functional resin has an acid number of less than about 55.

28. The ink system of claim 23 wherein the amount of said protective, clear coat is between about 3 and 6 grams per meter$^2$ of said label carrier.

29. The ink system of claim 23 further including a heat-activated, cross-linking agent in at least one of said color coat and said protective, clear coat.

30. The ink system of claim 29 wherein the at least one heat-activated, cross-linking agent is selected from the group consisting of urea and melamine formaldehyde.

31. The ink system of claim 29 wherein the amount of said heat-activated, cross-linking agent is between about 5 and 10 wt. %.

32. The ink system of claim 31 wherein the amount of said heat-activated, cross-linking agent is about 7 wt. %.

33. The ink system of claim 29 wherein said heat-activated, cross-linking agent has an activation temperature of greater than about 250° F.

34. The ink system of claim 33 wherein said heat-activated, cross-linking agent has an activation temperature of about 380° F.

35. The ink system of claim 29 wherein said color coat further includes pigments.

36. The ink system of claim 35 wherein said pigments are selected from the group consisting of organic and inorganic pigments.

37. A label stock, comprising:

(a) a water-reducible ink system for forming a water resistant ink label, said system comprising: (i) a color coat layer comprised of a first carboxylic acid functional resin; and (ii) a protective, clear coat layer on one surface of said color coat layer, wherein said protective, clear coat layer includes a second carboxylic acid functional resin and with the balance being water;

(b) a label carrier having a top surface and a bottom surface for receiving said water resistant ink label on said top surface of said label carrier wherein said clear coat layer of said water resistant ink label is adjacent to said label carrier; and (c) a heat-activated, polyurethane dispersion system adhesive for transferring said label from said label carrier to a substrate, wherein said heat-activated adhesive is on the surface of said water reducible ink label opposite from the surface of said water reducible ink label adjacent to said label carrier.

38. The label stock of claim 37 wherein said heat-activated adhesive has an activation temperature less than the distortion temperature of said label carrier.

39. The label stock of claim 38 wherein said activation temperature of said heat-activated adhesive is less than about 350° F.

40. The label stock of claim 39 wherein said activation temperature of said heat-activated adhesive is about 150° F.

41. The label stock of claim 37 wherein said polyurethane dispersion system includes an adhesive agent, an adhesion promoter, a viscosity stabilizer, and with the balance being water.

42. The label stock of claim 37 wherein said polyurethane dispersion system further includes a plasticizer and a wetting agent.

43. The label stock of claim 42 wherein said plasticizer is between about 0.5 and 1 wt. %.

44. The label stock of claim 42 wherein said plasticizer is about 1 wt. %.

45. The label stock of claim 42 wherein said wetting agent is between about 0.1 and 0.5 wt. %.

46. The label stock of claim 42 wherein said wetting agent is about 0.2 wt. %.

47. The label stock of claim 37 further comprising an intermediate, clear, primer coat between said adhesive and said water resistant ink label.

48. The label stock of claim 47 wherein said intermediate, clear, primer coat is a polyurethane dispersion.

49. The label stock of claim 37 wherein said label carrier is non-absorbent.

50. The label stock of claim 49 wherein said label carrier is paper.

51. The label stock of claim 50 wherein said label carrier is plastic.

52. The label stock of claim 51 wherein said label carrier is extruded.

53. The label stock of claim 51 wherein said label carrier is selected from the group consisting of polypropylene and polyester.

54. The label stock of claim 50 wherein said label carrier has a surface tension of between about 30 and 37 dynes.

55. The label stock of claim 50 wherein said label carrier further includes a release finish on the top surface of said paper label carrier.

56. The label stock of claim 55 wherein said release finish has a surface tension of less than about 36 dynes.

57. The label stock of claim 56 wherein said release finish is silicone.

58. The label stock of claim 57 wherein said release finish includes silicone in the amount of greater than or equal to about 10 wt. %.

59. The label stock of claim 37 wherein said color coat layer is selected from the group consisting of urethane, epoxy and acrylic carboxylic acid functional resins.

60. The label stock of claim 37 wherein said color coat layer includes a low acid number acrylic emulsion, a coalesing solvent, waxes, pigment and with the balance being water.

61. The label stock of claim 37 wherein said carboxylic acid functional resin has a lower acid number.

62. The label stock of claim 61 wherein said carboxylic acid functional resin has an acid number of less than about 55.

63. The label stock of claim 37 wherein the amount of said protective, clear coat is between about 3 and 6 grams per meter$^2$ of said label carrier.

64. The label stock of claim 37 further including a heat-activated, cross-linking agent in at least one of said color coat and said protective, clear coat.

65. The label stock of claim 64 wherein the at least one heat-activated, cross-linking agent is selected from the group consisting of urea and melamine formaldehyde.

66. The label stock of claim 64 wherein the amount of said heat-activated, cross-linking agent is between about 5 and 10 wt. %.

67. The label stock of claim 66 wherein the amount of said heat-activated, cross-linking agent is about 7 wt. %.

68. The label stock of claim 64 wherein said heat-activated, cross-linking agent has an activation temperature of greater than about 250° F.

69. The label stock of claim 68 wherein said heat-activated, cross-linking agent has an activation temperature of about 380° F.

70. The label stock of claim 37 wherein said color coat further includes pigments.

71. The label stock of claim 70 wherein said pigments are selected from the group consisting of organic and inorganic pigments.

* * * * *